US 6,554,106 B1

(12) United States Patent
Tokimoto (10) Patent No.: US 6,554,106 B1
(45) Date of Patent: Apr. 29, 2003

(54) FOOD AND DRINK CONVEYING DEVICE (75) Inventor: Shinichi Tokimoto, Osaka (JP)

(73) Assignee: Kura Corporation, Ltd., Osaka (JP)

( * ) Notice: Subject to any disclaimer, the term of this patent is extended or adjusted under 35 U.S.C. 154(b) by 271 days.

(21) Appl. No.: 09/692,034

(22) Filed: Oct. 19, 2000

(30) Foreign Application Priority Data

Oct. 21, 1999 (JP) .......................................... 11-299764

(51) Int. Cl.[7] ................................................ E04H 3/04
(52) U.S. Cl. ........................................ 186/49; 198/349
(58) Field of Search .............................. 186/49, 38, 39, 186/42; 198/340, 341.03, 349, 350, 465.2

(56) References Cited

U.S. PATENT DOCUMENTS

| | | | | |
|---|---|---|---|---|
| 1,330,890 A | * | 2/1920 | Mayne ........................ | 186/49 |
| 1,377,969 A | * | 5/1921 | Muntean ...................... | 186/42 |
| 3,378,105 A | * | 4/1968 | Kroemer, Jr. ................. | 186/49 |
| 4,349,086 A | * | 9/1982 | Yamada ....................... | 186/42 |

FOREIGN PATENT DOCUMENTS

JP         60-191910 A  *  9/1985    ........... B65G/47/53

* cited by examiner

*Primary Examiner*—Donald P Walsh
*Assistant Examiner*—Mark J Beauchaine
(74) *Attorney, Agent, or Firm*—Frishauf, Holtz, Goodman, & Chick, P.C.

(57) ABSTRACT

A conveying device is provided which has a conveying path for conveying in circulation a number of containers containing at least one of foods and drinks. The conveying device includes a plurality of mounting bases, arranged on the conveying path, for mounting the containers thereon; a mounting base identifier, provided on the mounting bases, for identifying the mounting bases; a container identifier, provided on the containers, for identifying the containers; a mounting base reading device for reading the mounting base identifiers provided on the mounting bases arranged on the conveying path; and a container reading device for reading the container identifiers provided on the containers circulating through the conveying path. Items to be served on the mounting bases are preset and mounting bases with no container thereon are identified based on output signals from the mounting base reading device and the container reading device. A display then displays items to be made.

7 Claims, 7 Drawing Sheets

FOOD AND DRINK CONVEYING DEVICE

BACKGROUND OF THE INVENTION

1. Field of the Invention

The present invention relates to a food and drink conveying device for use in a sushi shop and the like using the so-called revolving sushi system for circulating e.g. a variety of dished-up sushi through a conveying path so that customers can take out the circulating dished-up sushi from the conveying path at their own choice to eat them.

2. Description of the Prior Art

In general, in sushi shops using the food and drink conveying system for circulating the dished-up sushi in a dining area, cooks make sushi in the kitchen or cookery by making a small, oval-shaped, vinegared rice ball and then providing a topping on the vinegard rice ball. The cook puts up the sushi on a plate, and then puts the plate on the circulating conveying path to sequentially convey the dished-up sushi to the dining area. The customers take out the variety of circulating sushi from the conveying path at their own choice to eat them.

Incidentally, those sushi shops wish that all sorts of sushi be taken in the possible same number by the customers, but the popularity varies depending on the sorts of sushi presented. If many sorts of sushi of the same number are fed in the conveying path in sequence, regardless of the popularity, then many sorts of sushi of low popularity will be left in the conveying path.

For avoidance of this, the following method is generally adopted to feed a variety of sushi to the conveying path. For instance, the proportion in which a variety of sushi are fed to the conveying path is preset for every type of sushi so that the variety of sushi can be fed to the conveying path in the preset proportion at any time.

However, it is, needless to say, difficult for cooks to memorize those different proportions for the variety of sushi to be fed to the conveying path. Also, when the sushi shop is crowded with customers, it is very hard for the cooks to grasp which sorts of sushi the customers haue eaten and to supply those sorts of sushi at any time. This may produce the disadvantage that short supply or excess of supply of specific sorts of sushi may be caused.

SUMMARY OF THE INVENTION

In consideration of these circumstances, the present invention has been made. It is the object of the invention to provide a food and drink conveying device that can surely feed a variety of foods and drinks in a specified proportion without any need for the cook to grasp the patterns of the different proportions preset for every food and drink.

To achieve the above-noted object, the present invention provides a conveying device comprising a plurality of mounting bases, arranged on the conveying path, for mounting containers thereon; a mounting base identifier, provided on the mounting bases, for identifying the mounting bases; a container identifier provided on the containers, for identifying the containers; a mounting base reading device for reading the mounting base identifiers provided on the mounting bases arranged on the conveying path; a container reading device for reading the container identifiers provided on the containers circulating through the conveying path; presetting means for presetting items to be served on the mounting bases; judging means for identifying mounting bases with no container thereon based on output signals from the mounting base reading device and the container reading device; and a display for displaying items to be made based on output signals from the judgment means. This arrangement enables the cook(s) to surely serve a plurality of items of foods and/or drinks in a specified proportion without any need to grasp the patterns of the different proportions preset for every food and drink.

It is preferable that the food and drink conveying device includes a detecting means for calculating the circulating time of the containers mounted on their respective mounting bases circulating through the conveying path based on the output signals from the mounting base reading device and the container reading device, and for detecting a container whose circulating time exceeds a predetermined time. This produces the advantage of enabling the food and drink whose circulating time exceeds the predetermined time to be selected from the foods and drinks served on the mounting bases on the conveying path.

The food and drink conveying device may also include a take-away device to take away the container whose circulating time exceeds the predetermined time from the conveying path. This arrangement enables only the food and drink whose circulating time exceeds the predetermined time to be taken away from the conveying path.

Further, the food and drink conveying device may also include a shortcut mechanism for bridging a part of the conveying path to produce a plurality of short circulating conveying paths so that the mounting bases can be conveyed in circulation through one of the short circulating conveying paths via the shortcut mechanism. This arrangement enables a part of the conveying path to be paused.

DETAILED DESCRIPTION OF THE EMBODIMENTS

Referring now to the accompanying drawings, an example of the preferred embodiment of the present invention directed to a general managing system will be described below. It is to be understood, however, that the scope of the invention is by no means limited to the illustrated embodiment.

Figure 1:
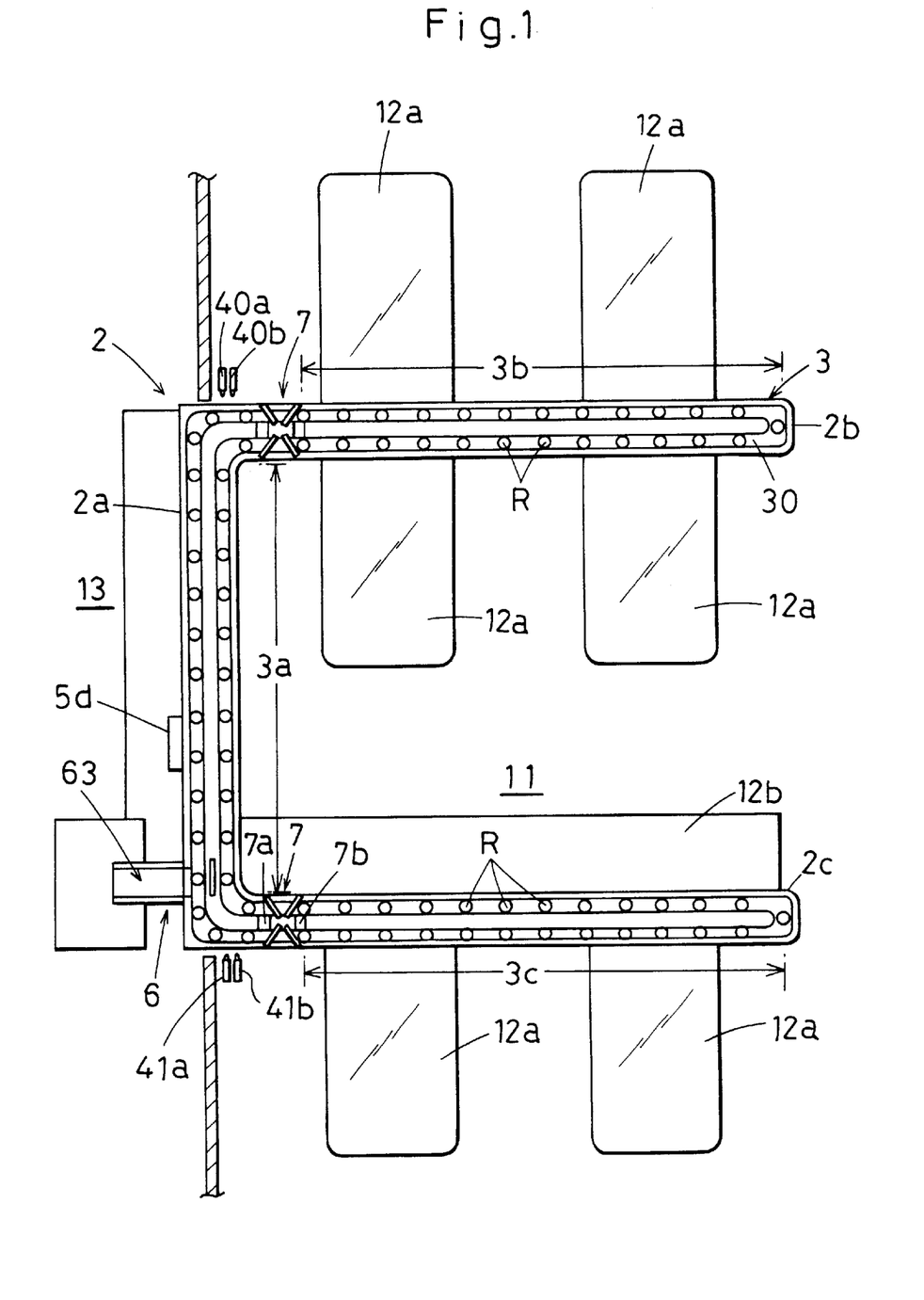
FIG. 1 is a schematic diagram of an interior of a shop having a food and drink conveying device.

Referring to FIG. 1, there is illustrated in plan an interior of a sushi shop having a food and drink conveying device 3 having a conveying path 30. Arranged in the interior of the sushi shop are a plurality of tables 12*a* and a counter 12*b* set in a dinning area 11; a compartment housing 2 arranged along a front side of a kitchen or cookery 13 and along the tables and the counter 12a, 12b; and the conveying path 30, circularly arranged on the compartment housing 2, for conveying sushi dished up on containers in the kitchen 13 to the respective tables 12a, 12b.

Figure 5:
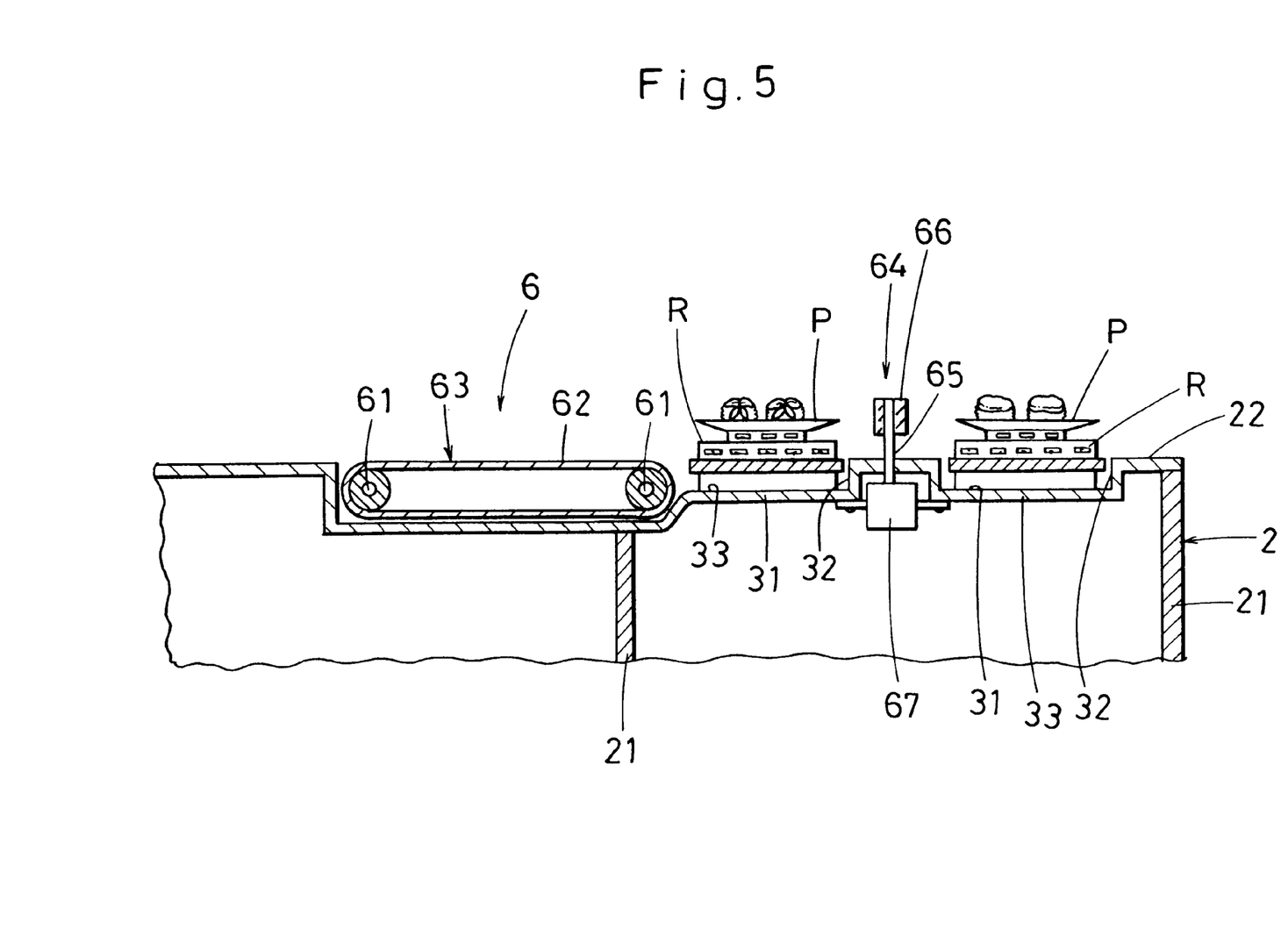
FIG. 5 is an enlarged view taken along the line X—X of FIG. 4.

As shown in FIG. 5, the compartment housing 2 is formed to have a box shape in section which is formed by spaced apart, opposite, side walls 21, a top wall 22 and a bottom wall (not shown) connecting between the both side walls 21 at upper and lower ends thereof.

The compartment housing 2 comprises a first housing portion 2a, arranged along the front side of the kitchen 13, for separating the kitchen 13 from the dinning area 11; second and third housing portions 2b, 2c bending from both lengthwise ends of the first housing portion 2a and extending in parallel into the dinning area 11. The tables 12a and the counter 12b are arranged alongside of the side walls 21, 22 at the second and third housing portions 2b, 2c. Hereinafter, the counter 12a and the tables 12a sometimes are simply referred to as the tables.

The conveying path 30 comprises a recess 31 provided in the top wall 22 of the housing portions 2a, 2b and 2c; and a flat endless chain 33 which is moved in circulation in the recess 31 by motor drive while it is guided along guide walls 32 provided at both widthwise sides of the recess 31. As shown in FIG. 5, a mounting base R mentioned later is put on the flat chain 33 and a plate P used as a container for dishing up a preset sushi is put on the mounting base R. Thus, the dished up sushi on the plate is allowed to circulate together with the mounting base.

In the food and drink conveying device thus constructed, the mounting base R is formed to have a disk like form so that the plate P can be mounted on it. Mounting base identifying seals 4a, each printing thereon a QR code of an identifying mark for identifying the respective mounting base R, are affixed around the outside of the mounting base R. Similarly, container identifying seals 4b, each printing thereon a QR code of an identifying mark for identifying the respective plate P, are affixed around the outside of the plate P.

Arranged at the base portions of the second and third housing portions 2b and 2c of the compartment housing 2 are first and second, laser, mounting base QR code scanners 40a, 41a as mounting base identifying mark reading devices for reading the identifying marks of the mounting base identifying seals 4a. Similarly, arranged at the base portions of the second and third housing portions are first and second, laser, container QR code scanners 40b, 41b as container identifying mark reading devices for reading the identifying marks of the container identifying seals 4b of the plates P circulating through the circulating path 30.

Figure 3:
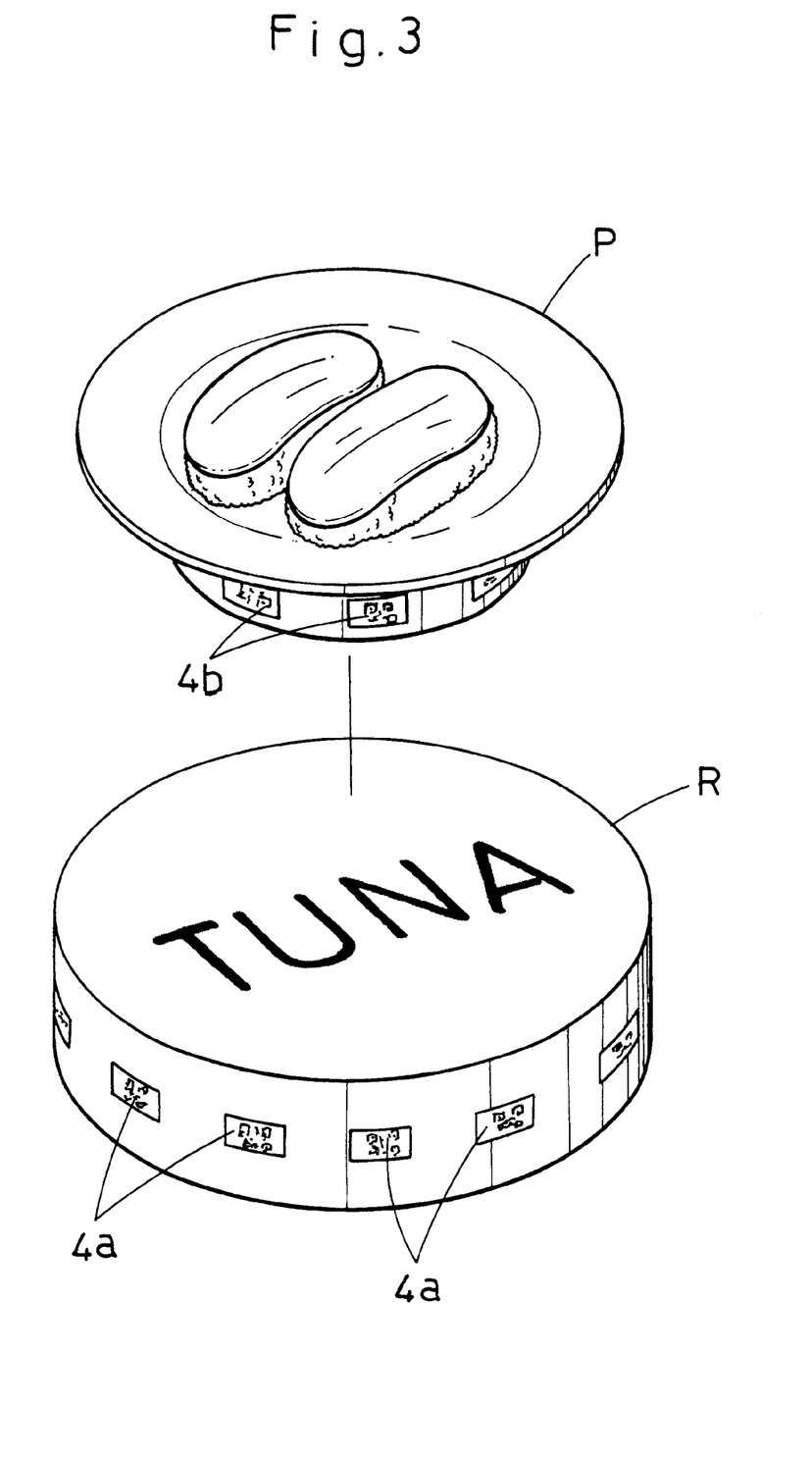
FIG. 3 is a schematic perspective view of a mounting base and a plate mounted thereon.

Printed on a top surface of each mounting base R is an illustration of a sort of sushi that is to be served on the mounting base R is, as shown in FIG. 3.

Figure 2:
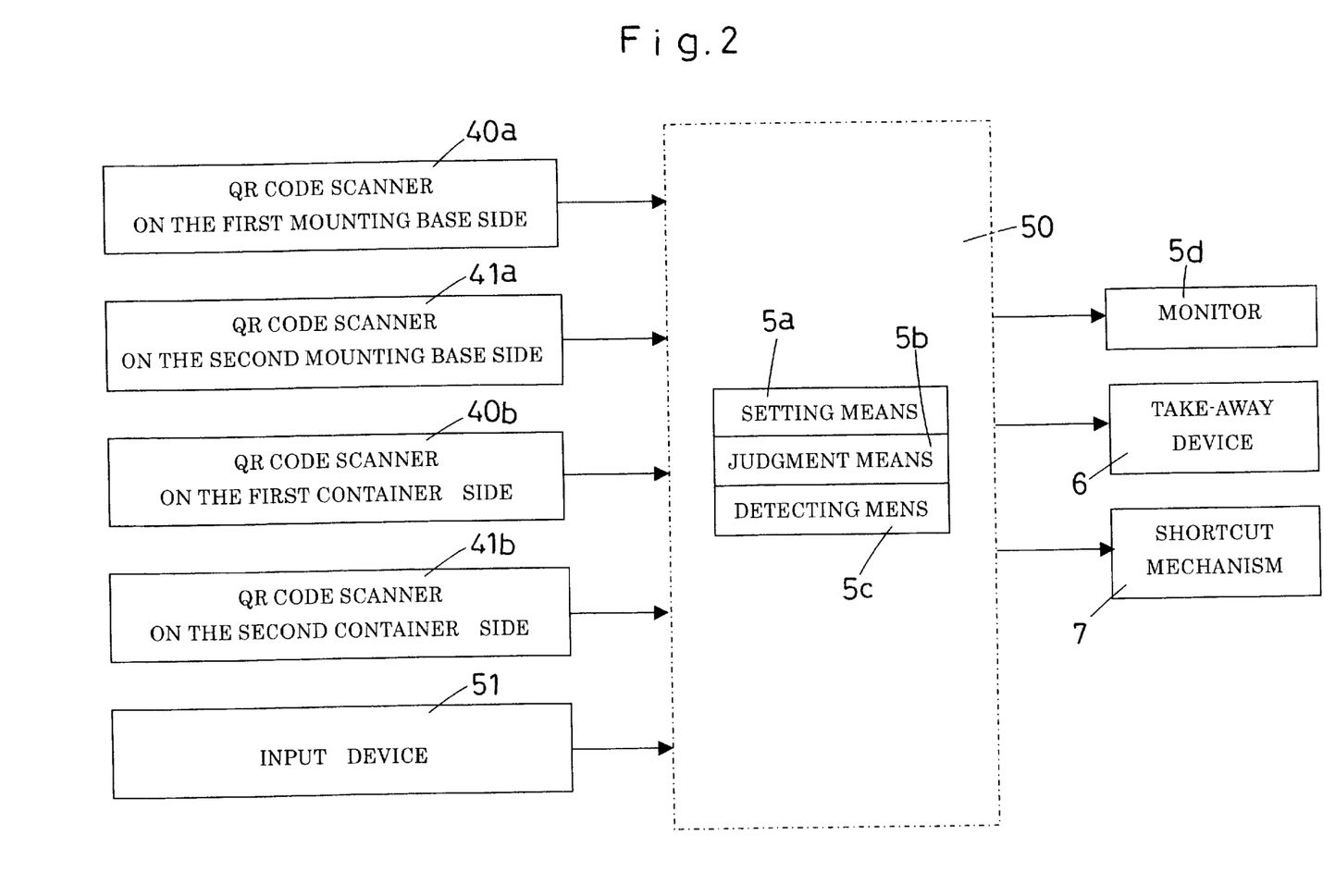
FIG. 2 is a block diagram of the food and drink conveying device.

The food and drink conveying device includes:

a presetting means 5a for presetting the sort of sushi that is to be served on the mounting base R for every mounting base R;

a judgment means 5b for determining the mounting base R with no container P on under output signals from the second mounting base QR code scanner 41a and the second container QR code scanner 41b;

a detecting means 5c for calculating the circulating time of the containers P mounted on their respective mounting bases R circulating through the conveying path 30 under output signals from the first and second mounting base QR code scanners 40a and 41a and the first and second container QR code scanners 40b and 41b and detecting a container P whose circulating time exceeds a predetermined time for the food and drink contained in the container P; and a monitor 5d used as a display means for displaying items of goods to be made, whereby the items of goods and a required number of foods and drinks to be served on the mounting bases R determined by the judgment means 5b are displayed on the monitor 5d.

In the illustrated embodiment, the presetting means 5a, the judgment means 5b and the detecting means 5c comprise a programmable control unit 50 comprising micro computers for controlling driving of the food and drink conveying device. Specified information and the like is entered from an input device 51 comprising a keyboard connected to the input side of the control unit 50.

The monitor 5d is set in the interior of the kitchen 13 and is connected to the output side of the control unit 50.

The mounting base QR code scanners 40a and the container QR code scanners 40b are connected to the input side of the control unit 50. Under signals from those QR code scanners 40a, 40b, the control unit 50 calculates the circulating time of each container P circulating through the conveying path 30, to detect a container P whose circulating time exceeds the predetermined time.

In the embodiment illustrated above, there is provided a take-away device 6 to take away the plate P whose circulating time exceeds the predetermined time from the conveying path 30 under the output signals from the control unit 50.

Figure 4:
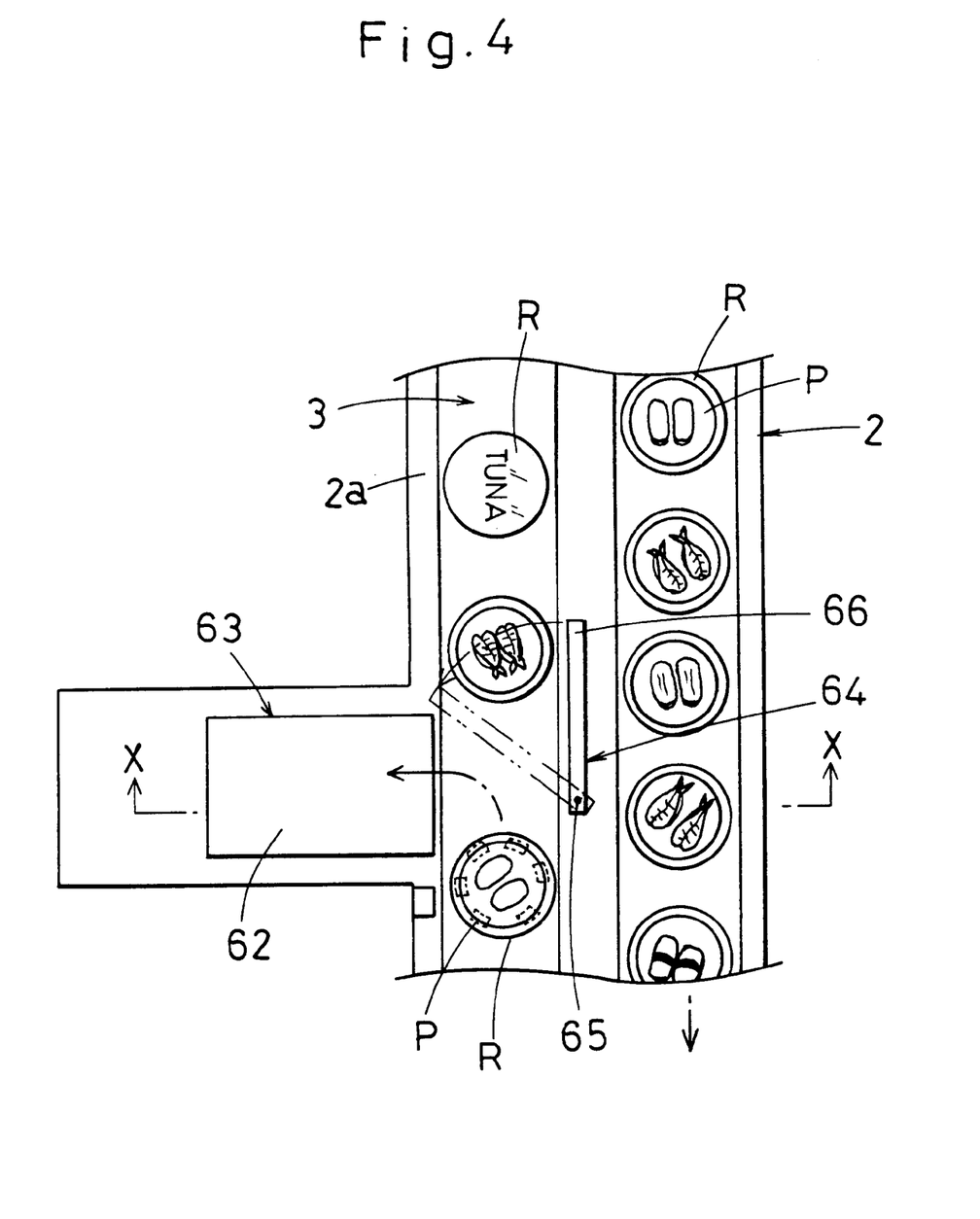
FIG. 4 is a schematic plan view of the food and drink conveying device at a part thereof at which a take-away device is arranged.

As schematically illustrated in FIGS. 4 and 5, the take-away device 6 comprises (i) a take-away path 63 formed by an endless conveyor belt 62 running between a pair of driving rollers 61 driven by a motor and (ii) a shifting device 64 for shifting the plate P from on the conveying path 30 to the take-away path 63. The plate P shifted to the take-away path 63 by the shifting device 64 is returned to the kitchen 13 through the conveyor belt 62.

As schematically illustrated in FIG. 5, the shifting device 64 has a pivot shaft 65 that is mounted to be pivotable with respect to the top wall 22, a guide member 66, one lengthwise end portion of which is fixed to an upper end portion of the pivot shaft 65, and a driving device 67 having a motor which is fixedly mounted on a lower end portion of the pivot shaft 65. The driving device 67 is connected to an output side of the control unit 50 so that the guide member 66 can be pivoted across the conveying path 30 under the control of the drive of the driving device 67 by the control unit 50, as indicated by a two-dot dashed line in FIG. 4, to shift only the plate P put on the mounting base R from the conveying path 30 to the take-away path 63.

Further, the second and third housing portions 2b, 2c are provided with shortcut mechanisms 7, respectively, for bridging parts of the conveying path 30 to produce two or more, short circulating conveying paths so that the mounting bases R can be conveyed in circulation through the short circulating conveying path via the shortcut mechanisms 7.

Figure 6:
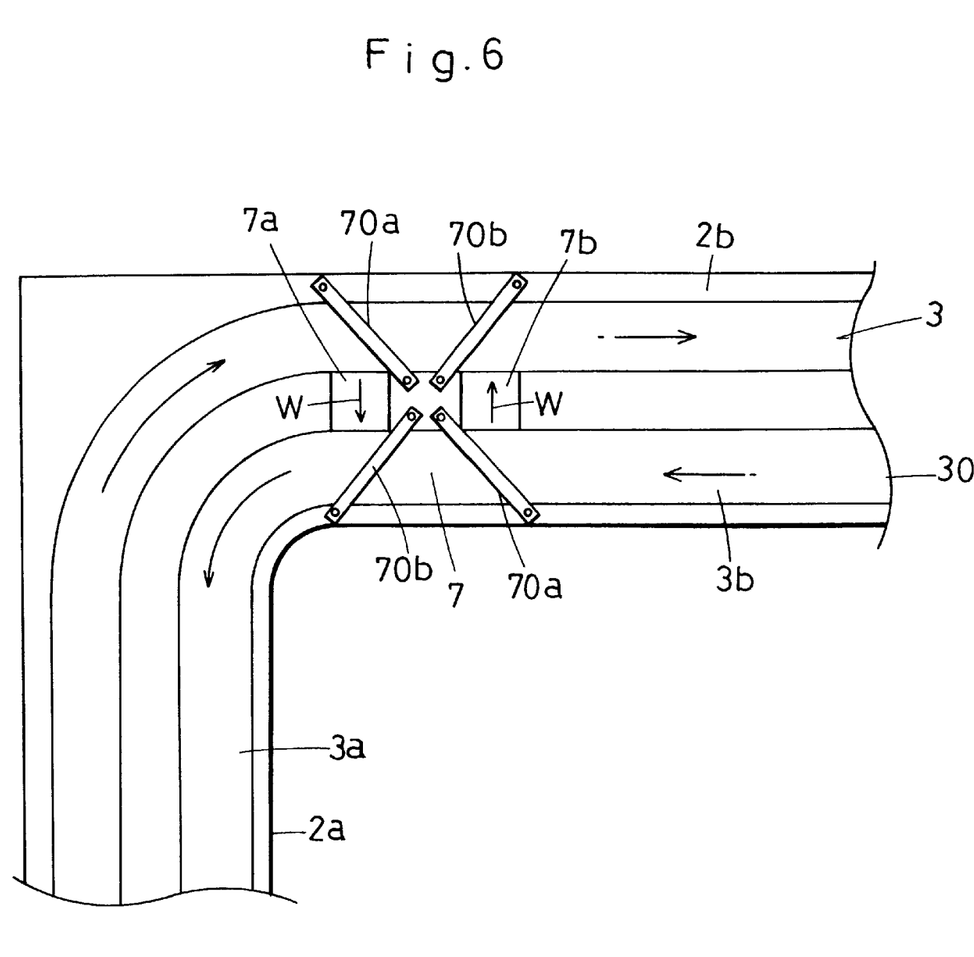
FIG. 6 is a schematic plan view of the food and drink conveying device at a part thereof at which a shortcut mechanism is arranged.
Figure 7:
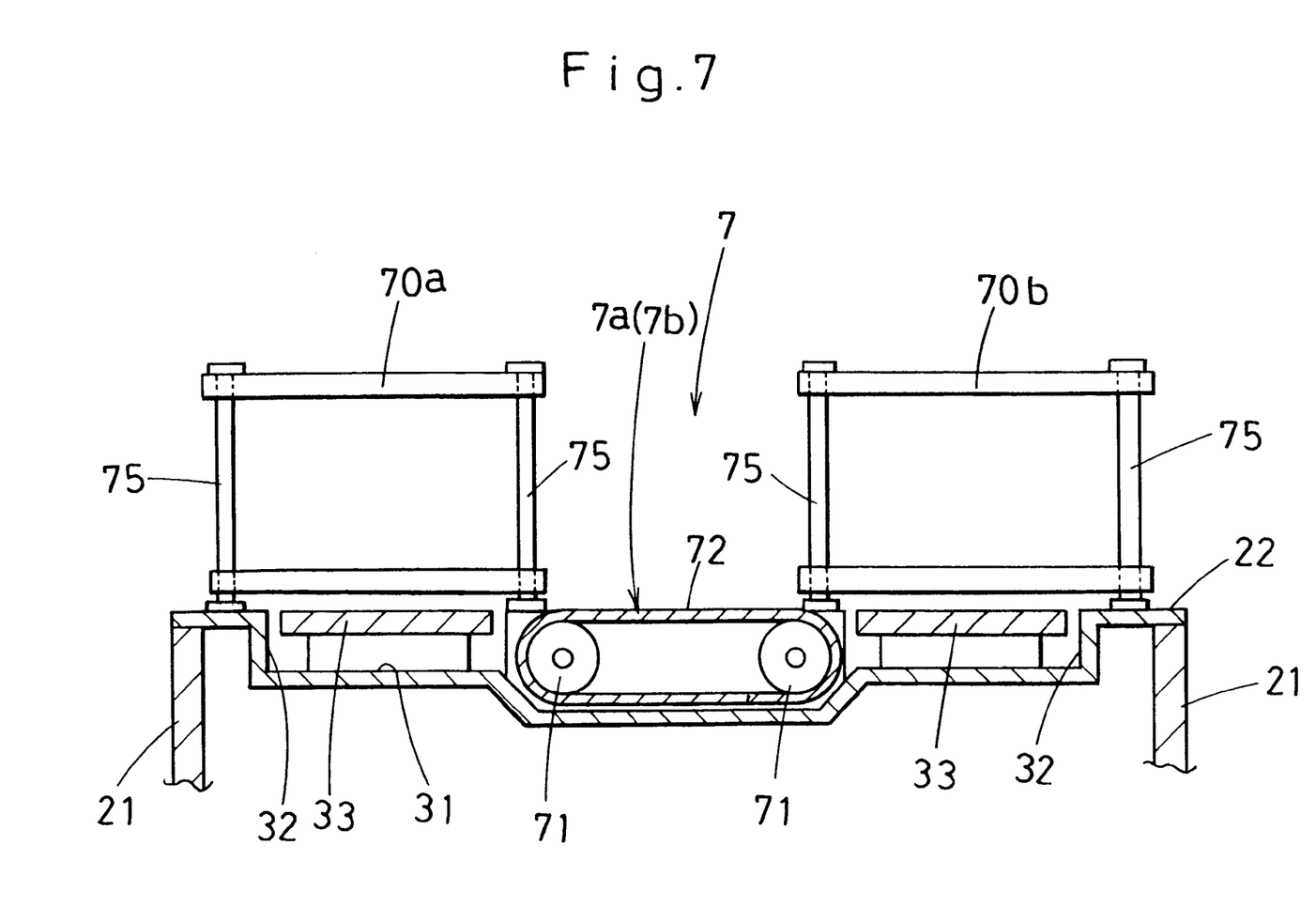
FIG. 7 is an enlarged sectional view of the food and drink conveying device at a part thereof at which the shortcut mechanism is arranged.

The shortcut mechanisms 7 is composed of a pair of short conveying paths 7a, 7b and a pair of first and second guide members 70a, 70b arranged at in-and-out portions of the short circulating conveying paths 7a, 7b, respectively, as shown in FIGS. 6 and 7.

Each of the short conveying path 7a, 7b is provided with a pair of rollers 71 and a conveying belt 72 spreading between the rollers 71 in endless relation, and a motor (not shown) as a drive for rotating one of the rollers 71. Along with the drive of the motor, the conveying belts 72 are driven to convey the mounting base R in the directions indicated by arrows W in FIG. 6, respectively.

The guide members 70*a*, 70*b* are separate from each other and are each composed of a sheet of narrow plate. As shown in FIGS. 6 and 7, the guide members 70*a*, 70*b* are slidably supported on supporting rods 75 standing upright from the top wall of the housing 2 at the intersection of the conveying path 30 so that the guide members can be shifted to a position at which the mounting base R is guided to the conveying path 30 or the short conveying path 7*a*, 7*b* cutting across the conveying path 30 and to a position at which the mounting base R is evacuated upwards of the conveying path 30.

Now, operation of the food and drink conveying device thus constructed will be described below.

First, the data on the patterns defining the number of sushi that are to be served on the conveying path 30 for every type of sushi are set in the presetting means 5*a* via the input device 7. Then, the types of sushi that are to be served on the mounting bases R are associated with the identifying marks of the mounting base identifying seals 4*a* affixed to the mounting bases R for every mounting base R and are set in the presetting means 5*a* through the input device 51.

Then, the mounting bases R, in which the types of sushi are arranged on the basis of "the patterns defining the number of sushi that are to be served on the conveying path 30 for every type of sushi" set in the presetting means 5*a*, are arranged on the conveying path 30. In the illustrated embodiment, when the mounting bases R are arranged on the conveying path 30, some types of sushi are also arranged in a specified ratio on each of the plurality of short circulating conveying paths 3*a*, 3*b*, 3*c* to which the conveying path 30 is switched by the operation of the shortcut mechanism 7. In this case, the mounting bases R that are to be arranged on the short circulating conveying paths 3*a*, 3*b*, 3*c* are distinguished by using different colors. For example, the mounting bases R on the short circulating path 3*a* are colored in red, those on the short circulating path 3*b* are colored in blue and those on the short circulating path 3*c* are colored in yellow.

The cook or cooks in the kitchen 13 make the sushi that are to be served on the mounting bases R; dish them up on their respective plates P; and put the plates P on the respective mounting bases R on the conveying path 30 in accordance with the printed types of sushi on the top surface of the mounting bases so that they can be conveyed via the conveying path 30. When the sushi starts to be conveyed, the identifying marks of the mounting base identifying seals 4*a* affixed to the mounting base R are read by the first mounting base QR code scanner 40*a* and also the identifying marks of the container identifying seals 4*b* affixed to the plate P are read by the first container QR code scanner 40*b*. Under the output signals from the first container QR code scanner 40*b*, the circulation start time is set in the control unit 50.

The plates P on which the sushi are dished up are conveyed in circulation to the tables 1*a*, 1*b*. The customers at the tables 1*a*, 1*b* take out the plates P of their favorite sushi from the mounting bases R flowing through the conveying path 30 at their own choice and have their favorite sushi.

The mounting bases R from which the plates P are taken out are conveyed back to the kitchen. In the stage in which the identifying marks of the mounting base identifying seals 4*a* are read by the second mounting base QR code scanner 41*a*, the identifying marks of the container identifying seals 4*b* cannot be read by the second container QR code scanner 41*b*. Under the output signals from the second mounting base QR code scanner 41*a* and the second container QR code scanner 41*b*, the absence of the plate P on the mounting base R is determined by the judgment means 5*b* and the sort of and the number of sushi set on the mounting base R is displayed on the monitor 5*d* through the control unit 50.

Thus, the cook(s) are only required to sequentially make the sort of sushi displayed on the monitor 5*d*, dish it up on the plate P, and shift the plate P to the specified mounting base R on the conveying path 30 and are not required to memorize the patterns defining the proportion in which the sushi are served for every type of sushi, as in the prior art. Further, the cook(s) need not concern concern themselves with the number and sorts of sushi flowing over the conveying path 30. Hence, even an inexperienced cook can perform the above-mentioned works smoothly.

On the other hand, the place P that was not taken out by the customers circulates through the conveying path 30 together with the mounting base R and returns to the kitchen 13. During this, the identifying marks of the container identifying seals 4*b* affixed to that plate P are read by the second container QR code scanner 41*b*. Under the signals from the second container QR code scanner 41*b*, the controller 7 judges the circulating time of that plate P at that moment, calculates the circulating time from the circulation start time until the present time, and compares the circulating time thus calculated with the preset circulating time on whether or not it exceeds the preset circulating time.

If the circulating time of that plate P of the plates circulating through the conveying path 30 exceeds the preset circulating time (e.g. 30 minutes), then the driving device 67 of the shifting device 64 is driven under the output signals from the control unit 50 to shift the guide member 66 to a position crossing the conveying path 30 and also drive the conveyor belt 62 of the take-away path 63, so that the plate P whose circulating time exceeds the preset circulating time is shifted from the mounting base R on the conveying path 30 to the take-away path 63 by the guide member 66, so as to be returned to the kitchen 13 through the take-away path 63.

When the take-away device 6 is operated, the initial data of the control unit 50 is cleared and the measurement of the circulating time of the plate P shifted to the take-away path 63 is terminated.

Thus, the plates P on the conveying path 30 that exceeded the preset circulating time are all collected to the kitchen 13 side through the take-away device 6, so that only the fresh sushi are offered to the customers.

Incidentally, for example in the case where the customers in the shop becomes small in number and no customers are seated, for example, on the second housing side, the conveyance of the plates to the conveying path on the second housing side is desired to be paused. In this case, the drive of the conveying path 30 is paused for a while when the mounting bases R that are distinguished by using different colors for their respective short circulating conveying paths 3*a*, 3*b*, 3*c* are placed on their respective short circulating paths 3*a*, 3*b*, 3*c*. In the illustration, when the mounting bases R colored in red, those R colored in blue and those R colored in yellow are placed on their respective short circulating conveying paths 3*a*, 3*b* and 3*c*, the drive of the conveying path 30 is paused for a while.

Thereafter, the motor 73 of the shortcut mechanism 7 set in the second housing portion 2*b* is driven through the control unit 50 to rotate the conveying belts 72 of the short conveying paths 7*a* and 7*b* and also slide the first and second guide members 70*a* and 70*b* down to the position indicated by a two-dot chain line in FIG. 7 to set them in the positions crossing the conveying path 30 at the in-and-out portions of the short conveying paths 7*a*, 7*b*. As a result of this, the mounting bases R colored in blue for the route of the short circulating conveying path 3*b* are conveyed in circulation through the short circulating conveying path 3*b*, and the other mounting bases R colored in red and yellow are conveyed in circulation in the remaining part of the conveying path 30 corresponding to the short circulating conveying paths 3*a*, 3*c*.

The plates P on the mounting bases R colored in blue on the short circulating conveying path 3*b* paused are removed.

While in the embodiment illustrated above, the seals with the identifying marks of the QR codes are used as the identifying means 5, these are not of restrictive. For example, the seals with identifying marks comprising barcodes may alternatively be used or IC chips may be used. The identifying marks, such as the QR codes and the barcodes, may be directly printed on the container and the mounting base. Alternatively, the identifying marks may be etched by using a laser beam.

While in the embodiment illustrated above, the monitor is used as the display means, this is not of restrictive. For example, a speaker may be used.

What is claimed is:

1. A conveying device having a conveying path for conveying in circulation a number of containers containing at least one of foods and drinks, the conveying device comprising:

a plurality of mounting bases, arranged on the conveying path, for mounting the containers thereon;

a mounting base identifier, provided on the mounting bases, for identifying the mounting bases;

a container identifier, provided on the containers, for identifying the containers;

a mounting base reading device for reading the mounting base identifiers provided on the mounting bases arranged on the conveying path;

a container reading device for reading the container identifiers provided on the containers circulating through the conveying path;

presetting means for presetting items that are to be served on the mounting bases;

judging means for identifying mounting bases with no container thereon based on output signals from the mounting base reading device and the container reading device; and a display for displaying items to be made, based on output signals from the judgment means.

2. The conveying device according to claim 1, further comprising a shortcut mechanism for bridging a part of the conveying path to produce a plurality of short circulating conveying paths so that the mounting bases can be conveyed in circulation through one of the short circulating conveying paths via the shortcut mechanism.

3. The conveying device according to claim 1, further comprising detecting means for calculating a circulating time of the containers mounted on their respective mounting bases circulating through the conveying path based on the output signals from the mounting base reading device and the container reading device, and for detecting a container whose circulating time exceeds a predetermined time.

4. The conveying device according to claim 3, further comprising a shortcut mechanism for bridging part of the conveying path to produce a plurality of short circulating conveying paths so that the mounting bases can be conveyed in circulation through one of the short circulating conveying paths via the shortcut mechanism.

5. The conveying device according to claim 3, further comprising a take-away device to take away the container whose circulating time exceeds the predetermined time from the conveying path.

6. The conveying device according to claim 5, further comprising a shortcut mechanism for bridging part of the conveying path to produce a plurality of short circulating conveying paths so that the mounting bases can be conveyed in circulation through one of the short circulating conveying paths via the shortcut mechanism.

7. The conveying device according to claim 3, wherein the predetermined time is set in accordance with a content of the container.

\* \* \* \* \*